July 19, 1966  G. M. SPENCE ET AL  3,261,700
KILN BRICK
Filed Feb. 6, 1963
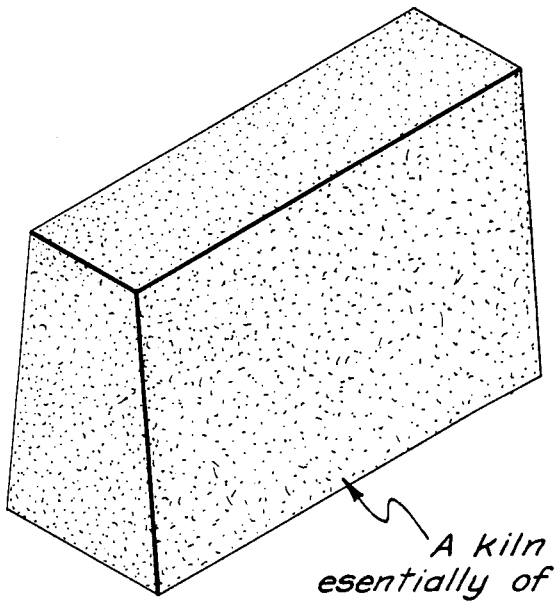
A kiln brick consisting esentially of tetracalcium aluminum ferrite, tricalcium aluminate and tricalcium silicate.
INVENTORS
GERALD M. SPENCE,
ALIF R. BRYAN
BY EDWARD D. O'BRIAN
ATTORNEY 3,261,700
Patented July 19, 1966

---

3,261,700
KILN BRICK
Gerald M. Spence, Monolith, and Alif R. Bryan, Tehachapi, Calif., assignors to Monolith Portland Cement Co., Los Angeles, Calif., a corporation of Nevada
Filed Feb. 6, 1963, Ser. No. 256,599
5 Claims. (Cl. 106—64)

This invention pertains to new and improved kiln bricks, and more specifically to kiln bricks which are designed to be used in rotary Portland cement kilns.

In a sense the bricks used in lining a rotary cement kiln, and in particular the so-called burning zone of such a kiln are critical to the operation of such a kiln. This criticality is primarily a matter of economics. The economic considerations with respect to the use of any particular type of bricks as a lining within a rotary kiln are related to the many functions performed by a brick lining within a rotary cement kiln and the ability of the lining to perform these functions satisfactorily over a prolonged period.

It has often been recognized that cement clinker would be desirable as a material for use in the formation of kiln bricks for use in a rotary cement kiln for a number of reasons. One of these reasons is that this material is available at a comparatively nominal cost; another is that this material is of such a character that it normally will not react detrimentally with the material processed in a rotary cement kiln. It is also recognized that a cement clinker brick should normally acquire and physically hold a protective coating of the material being processed in a rotary cement kiln, in a desired manner, and that such a coating is normally beneficial to satisfactory kiln operation.

Unfortunately, the prior uses of cement clinker as a raw material for rotary kiln bricks cannot be regarded as complete success even though there have been instances of the successful use of so-called "clinker bricks." This is considered to be evidenced by the fact that this type of kiln brick is not in commercial use to a significant extent. It is considered that bricks of this type are not commonly used because of the fact that they do not "hold up" or last an economically long enough period to justify their being used.

An object of this invention is to provide new and improved kiln bricks of a so-called "cement clinker" type. Another object of this invention is to provide kiln bricks of this type which in use give a sufficiently satisfactory performance so as to justify their being employed instead of other known kiln bricks. A further object of this invention is to provide cement clinker type kiln bricks which can be manufactured at a comparatively nominal cost.

These and various other objects of this invention as well as many specific advantages of it will be more fully apparent from a detailed consideration of the remainder of this specification, the appended claims and the accompanying drawing in which:

There is shown a kiln brick of this invention.

As an aid to the understanding of this invention it can be stated in essentially summary form that it concerns kiln bricks which are formed from all of the principal ingredients of conventional cement clinker except dicalcium silicate. By varying a conventional cement clinker so as to eliminate the presence of this compound in effect a "special" type of cement clinker is formed which can be used in a kiln brick so as to achieve a brick life which cannot consistently be achieved from similar brick made from a conventional cement clinker.

This preceding statement can be best understood by considering the characteristics of dicalcium silicate. This compound is recognized as having several different crystalline forms. As it is normally produced in a cement kiln it has the so-called "beta" crystal form. Upon slow cooling this beta dicalcium silicate will normally change to the so-called gamma crystalline form at a temperature of about 675° C. This change of physical form is normally accompanied by about a 10% increase in volume of the dicalcium silicate. This inversion or decrepitation is normally prevented by quenching or relatively quickly cooling cement clinker as it comes from a kiln where it is produced.

Thus, conventional cement clinker as used in a known type of cement clinker brick contains the beta form of dicalcium silicate, along with various other conventional cement compounds. It has been discovered that the presence of this compound is responsible for failure of these brick because of its change in crystalline form during the use of these brick. This can be easily realized by considering the fact that dicalcium silicate changes from the beta to the gamma form it increases in volume and that this volumetric change tends to physically disrupt the physical structure of a known clinker brick, causing premature failure of the brick.

In accordance with this invention such failure is eliminated by eliminating the presence of the dicalcium silicate.

This result can be achieved by forming a clinker brick of this invention from a "special cement clinker formed by proportioning raw materials as are used in the manufacture of Portland cement so as to avoid the formation of this compound. In general such a "special" clinker can be formed by decreasing the amount of silica and increasing the amount of lime in a conventional type of mixture as is employed in the manufacture of Portland cement and "burning" this modified type of mixture in the same manner in which a conventional cement clinker is formed.

Such a "special" clinker can be sized and pressed into a suitable refractory type of rotary kiln brick in accordance with conventional practice, and can be used in a rotary kiln either with or without being "fired" so as to physically bond the particles within it together in accordance with conventional refractory practice. If such a brick is to be used without being fired it is considered preferable to bond the individual particles within it together through the use of a bonding agent or material serving to impart to the brick sufficient strength to enable it to be handled without danger of breakage. If desired these bricks may be fired as disclosed in the copending application Serial No. 256,601, filed February 6, 1963, entitled Kiln Brick. The sizing of the particles within a brick of this invention and the pressing of such brick may be as described in this application. The entire disclosure of this application is incorporated herein by reference.

During the pressing of a brick of this type a conventional type of ceramic lubricant serving to aid in the compaction of the particles being pressed can be employed. Suitable lubricants are common diesel fuel, bunker C oil, tall oil and the like. A 10% aqueous solution of sucrose can be used as a lubricant to facilitate pressing. Such a solution is acceptable since it does not result in any significant hydration of the cement compounds present in the "special" clinker during the processing steps. Any such hydration would be undesirable since it would result in combined water being in the brick in a form in which such water might be released from a hydrated composition as steam during the use of the brick. Any such release of water vapor would, of course, tend to weaken or disrupt the bond or bonds created by the hydrated material and having a detrimental effect on the brick from which it would be released.

The principal compounds present in a clinker brick of this invention are the principal compounds found in cement clinker other than dicalcium silicate—namely, tetracalcium aluminum ferrite, tricalcium aluminate and tricalcium silicate. Minor proportions of contaminants such as compounds of the type normally found in minor or insignificant proportions in cement clinker in an amount less than about 5% by weight of a complete brick can normally be present without changing the character of the brick from that desired in accordance with the present invention. Even up to about this amount of dicalcium silicate can be present in a clinker brick of this invention without departing from the character of this invention since such a minor amount of this compound will not have a sufficient effect upon decrepitation to significantly effect the physical structure of the brick.

Those skilled in the field of chemistry of cement compounds will realize that under certain conditions tricalcium silicate will decompose so as to yield so-called free lime and dicalcium silicate. Because of this, it might normally be expected that a clinker brick falling within the scope of this invention would be unstable, and would not be satisfactory because of the tendency of such dicalcium silicate resulting from the decomposition of tricalcium silicate to change in physical form. The results achieved with the present invention indicate that this decomposition of tricalcium silicate does not occur to any significant extent within a clinker brick of the present invention and, hence, the problem outlined in this paragraph is not present with this invention. It is believed that this result is achieved because of the fact that the presence of tetracalcium aluminum ferrite and tricalcium aluminate along with tricalcium silicate in a kiln brick of this invention tends to inhibit or prevent the decomposition of tricalcium silicate to lime and dicalcium silicate in some presently un-understood manner.

Because of this, it is presently considered that a clinker brick of this invention should contain from about 1 to 10% by weight of tetracalcium ferrite, 1 to 10% by weight of tricalcium aluminate, not more than 5% by weight of contaminants as indicated in the preceding and the balance tricalcium silicate. With a brick formed in this manner it is believed that adequate cement compounds are present to effectively eliminate the problem of decomposition of tricalcium silicate indicated in the preceding paragraph. If too great a proportion of either tetracalcium aluminum ferrite or tricalcium aluminate is present in a clinker brick of the present invention, it is considered that such a brick will lack an adequate heat resistance for use in "critical" areas of a rotary kiln such as in the burning zone lining.

As an example of this invention, a brick as herein described and as shown in the accompanying drawing can have a composition of 21.83% by weight $SiO_2$, 5.00% by weight $Al_2O_3$, 2.00% by weight $Fe_2O_3$, 70.17% by weight CaO, and 1.00% by weight other. This corresponds to a cement type clinker having the following proportions of the indicated conventional cement compounds: 6.08% by weight tetracalcium aluminum ferrite, 9.86% by weight tricalcium aluminate, 0.01% by weight dicalcium silicate, 83.05% by weight tricalcium silicate, and 1.00% by weight other.

A brick having such a composition may be manufactured as set forth in the aforenoted application Serial #256,601 by using clinker particles varying in size from particles passing a 10-mesh standard Tyler screen to particles which pass a 325-mesh screen of the same type, about one-half of such particles passing a 30-mesh screen of this same type by pressing such particles into a standard "arch" shape, approximately 3″ x 9″ x 12″ using a pressure of about 5 tons per square inch from one side of the brick. The pressed brick obtained can then be fired to obtain an outer fused shell as described in said application by being heated and cooled as follows: by being gradually heated from ambient temperature to 2000° F. at a uniform rate so as to achieve this temperature at the end of a 48-hour period; then being rapidly increased in temperature to a temperature to about 2500° F. and held at this temperature for a 2-hour period, and then being quickly dropped in temperature to 2000° F.; and finally being cooled at a uniform cooling rate so as to reach an ambient temperature at the end of a 36-hour period.

From a careful consideration of this specification it will be realized that a "special" clinker as is employed in accordance with this invention in kiln bricks can be easily and conveniently created using the same equipment and procedure as is normally employed in the manufacture of Portland cement. It will be realized that a kiln brick as herein described can be formed to any desired shape or size, using established techniques in the brick and refractory arts. It will be further realized that kiln bricks as herein described can be economically manufactured and used so as to achieve a commercially significant advantage.

We claim:
1. A kiln brick consisting essentially of tetracalcium aluminum ferrite, tricalcium aluminate and tricalcium silicate.
2. A kiln brick consisting essentially of at least 95% of a mixture of tetracalcium aluminum ferrite, tricalcium aluminate and tricalcium silicate.
3. A kiln brick consisting essentially of a mixture of cement clinker particles consisting essentially of unhydrated tetracalcium aluminum ferrite, unhydrated tricalcium aluminate and unhydrated tricalcium silicate.
4. A kiln brick consisting essentially of at least 95% by weight of a mixture of cement clinker particles consisting essentially of unhydrated tetracalcium aluminum ferrite, unhydrated tricalcium aluminate and unhydrated tricalcium silicate.
5. A kiln brick consisting essentially of from 1 to 10% by weight tetracalcium aluminate ferrite, 1 to 10% by weight tricalcium aluminate and less than 5% by weight contaminants and the remainder tricalcium silicate.

References Cited by the Examiner
UNITED STATES PATENTS
2,083,180  6/1937  Work _____ 106—64

TOBIAS E. LEVOW, *Primary Examiner.*
J. E. POER, *Assistant Examiner.*